(12) United States Patent
Van Brocklin et al.

(10) Patent No.: US 7,301,879 B1
(45) Date of Patent: Nov. 27, 2007

(54) OPTICAL PRINT HEAD

(75) Inventors: Andrew L. Van Brocklin, Corvallis, OR (US); Kuohua Wu, Corvallis, OR (US); Vladek P. Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/520,281

(22) Filed: Sep. 12, 2006

(51) Int. Cl.
G11B 3/74 (2006.01)
G02B 6/32 (2006.01)
G02B 6/26 (2006.01)
G02B 6/30 (2006.01)

(52) U.S. Cl. .......................... 369/94; 385/14; 385/31; 385/33; 385/39; 385/49

(58) Field of Classification Search .............. 369/112, 369/109, 102, 44, 46, 112.08, 48, 94; 385/15, 385/31, 33, 39, 49
See application file for complete search history.

(56) References Cited

U.S. PATENT DOCUMENTS

| | | | |
|---|---|---|---|
| 4,626,679 A | 12/1986 | Kuwayama et al. | |
| 4,771,415 A | 9/1988 | Taki | |
| 5,033,043 A | 7/1991 | Hayakawa | |
| 5,218,582 A | 6/1993 | Marchant | |
| 5,349,471 A | 9/1994 | Morris et al. | |
| 5,453,961 A | 9/1995 | Brazas | |
| 5,526,338 A * | 6/1996 | Hasman et al. | 369/94 |
| 5,715,091 A | 2/1998 | Meyers | |
| 5,850,375 A | 12/1998 | Wilde et al. | |
| 5,940,549 A | 8/1999 | Wilde et al. | |
| 6,034,938 A | 3/2000 | Heanue et al. | |
| 6,081,499 A | 6/2000 | Berger et al. | |
| 6,088,322 A | 7/2000 | Broome et al. | |
| 6,298,027 B1 | 10/2001 | Wilde et al. | |
| 6,349,082 B1 | 2/2002 | Horie et al. | |
| 6,349,162 B1 | 2/2002 | Shiraishi et al. | |
| 6,529,464 B2 | 3/2003 | Wilde et al. | |
| 6,545,807 B2 | 4/2003 | Maruyama | |
| 6,781,927 B1 | 8/2004 | Heanue et al. | |
| 6,873,590 B2 | 3/2005 | Takeuchi et al. | |
| 6,896,419 B2 | 5/2005 | Yamada et al. | |
| 6,937,396 B2 | 8/2005 | Cho et al. | |
| 6,950,384 B2 | 9/2005 | Arai et al. | |
| 6,966,707 B2 | 11/2005 | Yamada et al. | |

(Continued)

FOREIGN PATENT DOCUMENTS

WO WO-03060893 A1 7/2003

OTHER PUBLICATIONS

Eggleton et al. "Microstructured Optical Fiber Devices," Optics Express V. 9 No. 13 (Dec. 17, 2001) pp. 698-713.

(Continued)

*Primary Examiner*—Quyen P Leung

(57) ABSTRACT

An optical print head for recording on a medium includes a plurality of lasers having laser emissions within a desired wavelength range, an optical fiber adapted to receive combined light from the plurality of lasers at a first end and to emit combined output light at a second end, and includes a hybrid optical element optically coupled to the second end of the optical fiber and adapted to focus the combined output light within the desired wavelength range on the medium.

22 Claims, 2 Drawing Sheets

U.S. PATENT DOCUMENTS

| | | |
|---|---|---|
| 2002/0024919 A1 | 2/2002 | Lee et al. |
| 2002/0131742 A1 | 9/2002 | Bayart et al. |
| 2002/0164106 A1 | 11/2002 | Mizuno |
| 2003/0185134 A1* | 10/2003 | Kimura et al. ......... 369/112.08 |
| 2005/0078324 A1 | 4/2005 | Koll et al. |
| 2005/0169119 A1 | 8/2005 | Van Brocklin et al. |
| 2005/0271340 A1 | 12/2005 | Weisberg et al. |
| 2006/0010921 A1 | 1/2006 | Mori et al. |
| 2006/0024009 A1 | 2/2006 | Kubota et al. |

OTHER PUBLICATIONS

Suzuki et al., "Optical properties of a low-loss polarization-maintaining photonic crystal fiber" Optics Express V. 9 No. 13 (Dec. 17, 2001) pp. 676-680.

Anderson et al. "Use of laser-diode arrays in holographic interconnections," Applied optics, vol. 31, No. 35 (Dec. 10, 1992), pp. 7411-7416.

Miyagawa et al., "Computational analysis of a holographic optical head configuration," Applied Optics, vol. 31, No. 35 (Dec. 10, 1992) pp. 7457-7463.

Komma et al., "Holographic optical element for an optical disk head with spot-size detection," Applied Optics, vol. 29 (Dec. 1990), pp. 5127-5130.

Kimura et al., "Compact optical head using a holographic optical element for CD players," Applied Optics, vol. 27 (Feb. 1988) pp. 668-671.

Latta et al., "Compact Single Element Bidirectional Optical Disk Lens Element," IBM Tech. Discl. Bull. (Aug. 1988) pp. 18-23.

Stone et al., "Hybrid Diffractive-Refractive Lenses and Achromats," Applied Optics, vol. 27, No. 14 (Jul. 15, 1988), pp. 2960-2971.

Begley et al., "Aperture shared laser diode array beam combiner," Applied Optics. vol. 27, No. 13 (Jul. 1, 1988), pp. 2685-2687.

Barnes et al. "Use of optical fiber heads for optical disks," Applied Optics vol. 25, No. 22 (Nov. 15, 1986), pp. 4010-4012.

Ura et al., "An Integrated-Optic Disk Pickup Device," J. Lightwave Technology, vol. LT-4, No. 7 (Jul. 1986) pp. 913-918.

Broockman, "Chromatic Focusing Technique," IBM Tech. Discl. Bull., (May 1985), pp. 6850-6851.

Cohen et al. "Microlenses for Coupling Junction Lasers to Optical Fibers," Applied Optics vol. 13, Jan. 1974, pp. 89-94.

Anon., "Tools of the Trade" vol. 18, catalog, Thorlabs, Inc., Newton, NJ (2006) pp. 883-894, no month.

* cited by examiner

OPTICAL PRINT HEAD

CROSS-REFERENCE TO RELATED APPLICATION

This application is related to co-pending and commonly assigned application Ser. No. 11/520,514, filed on the same date herewith (Sep. 12, 2006), the entire disclosure of which is incorporated herein by reference.

TECHNICAL FIELD

This invention relates generally to optical recording and more particularly to optical print heads.

BACKGROUND

Optical recording technology that enables consumers and others to record laser-written labels on specially coated recordable CD and DVD media has enjoyed notable commercial success. In light-activated thermal label-recording technology, a surface of the medium is coated with a writable layer of a material that changes appearance when it absorbs laser light of a predetermined wavelength. The color change interaction in a thermochromic imageable coating is enabled by phase transitions of the coating materials occurring at elevated temperatures. These phase transitions do not occur (and, so color does not develop) until the coating temperature reaches a certain value specific to the coating material. If the coating is irradiated with laser energy density that is not high enough to reach the phase transition, the color is not developed. Thus, if a writable layer is exposed to laser radiation with an irradiance distribution in which significant portions have insufficient irradiance to reach the color-forming (phase transition) temperature, some of the energy of the laser radiation is wasted. When relatively high-power laser radiation is required, cost increases can occur due to disproportionately higher laser cost. When multiple laser wavelengths are required, such as for color recording, differences in focal distance for the various laser wavelengths may require optics compatible with a focusing servo system. Thus, there is a need for further improvement in marking of media.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Figure 1:
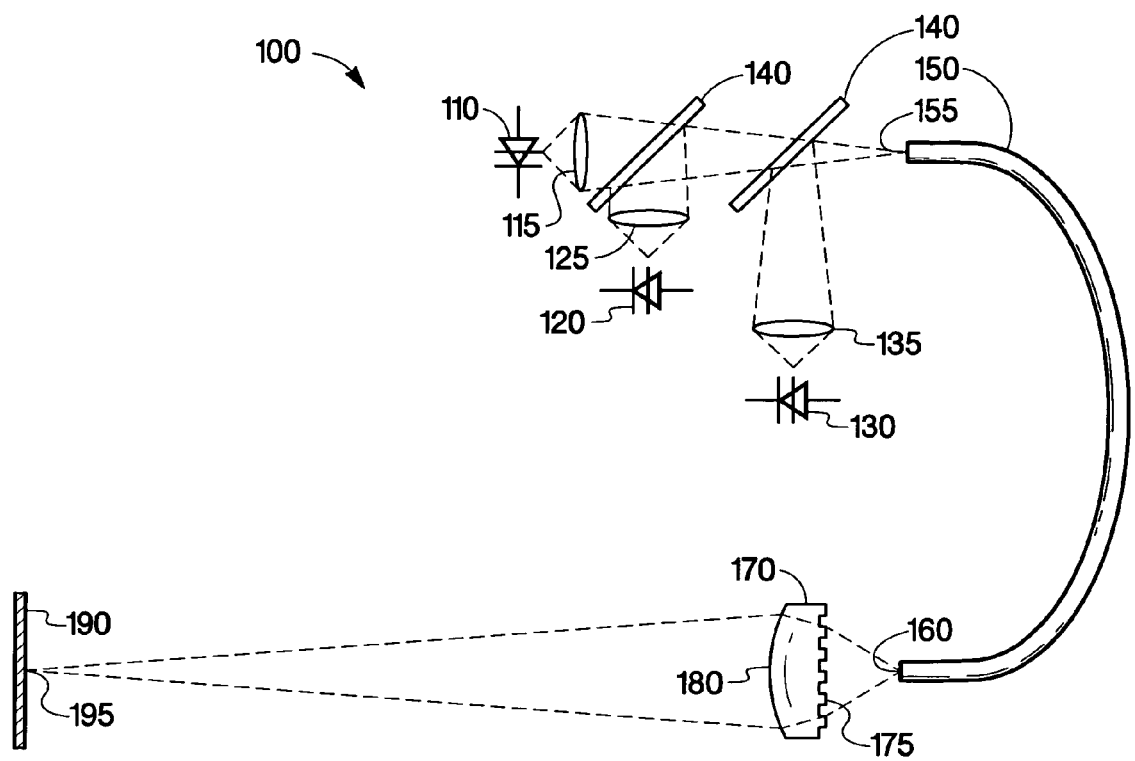
FIG. 1 is a schematic optical diagram of a first embodiment of an optical print head.

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., is used with reference to the orientation of the drawing figure(s) being described. Because components of the invention can be positioned in a number of different orientations, the directional terminology is used for purposes of illustration and is in no way limiting. Similarly, for purposes of illustration but in no way limiting, optical diagrams may be drawn to non-uniform scales and may show elements with non-proportional dimensions.

The terms "recordable medium" and "recordable media" as used in this specification and the appended claims refer to media capable of having information recorded thereon by exposure to optical radiation such as laser light. Such recordable media may include, for example, a compact disk (CD), a digital versatile disk (DVD), an HD-DVD, a Blu-ray Disc™ (BD), a holographic versatile disk (HVD), or a video disk, but are not limited to such forms. Recordable media may also include such media having pre-recorded information readable from at least one side and having an optically-recordable coating on at least the other side for writing a label on the media. The term "recording" means recording or printing a label or other information on a recordable medium such as an optical storage disk.

One aspect of the invention provides embodiments of an optical print head including a number of lasers having laser emissions within a desired wavelength range, an optical fiber receiving combined light from the lasers at one end and emitting combined output light at its other end, and including a hybrid optical element optically coupled to the exit end of the optical fiber. The hybrid optical element is adapted to focus the combined output light within the desired wavelength range on a medium for recording. For many embodiments, the optical fiber may be a single-mode optical fiber. For example, when a single-mode fiber is used, not all the modes of a multi-mode laser are propagated by the optical fiber.

FIG. 1 schematically shows an optical diagram of a first embodiment of an optical print head 100. A number of lasers, such as the three lasers 110, 120, and 130 shown, have laser emissions within a desired wavelength range. The desired wavelength range may include wavelengths between about 365 nanometers and about 1600 nanometers, for example. The laser emissions of lasers 110, 120, and 130 may be directed substantially parallel to each other in parallel beams, the parallel beams being optically combined into a beam of combined light. While FIG. 1 shows three lasers, any convenient number of multiple lasers may be used. Depending on the application, the laser emissions of the lasers may have various different wavelengths within the desired wavelength range, or they may all have substantially the same wavelength, e.g., 780 nanometers. Such a monochromatic laser light source can provide a higher power combined output light without the disproportionately higher cost of a single high-power laser.

An optical fiber 150 receives combined light from the lasers at one end 155 and emits combined output light at its other end 160. The laser emissions from lasers 110, 120, and 130 are combined and optically coupled to optical fiber 150 by coupling lenses 115, 125, and 135 respectively, using one or more mirrors 140 or their equivalents if needed to direct the light toward the entrance end 155 of optical fiber 150. Mirrors 140 may be one or more dichroic mirrors to combine light from the various lasers into a combined beam. Each coupling lens 115, 125, and 135 optically coupled with its respective laser may be movable in a direction substantially parallel to its own optical axis for focusing. Automatic-focusing-servo arrangements such as those using "voice-coil" actuators for moving lenses are known in the art.

Optical fiber 150 may be, for example, a photonic crystal fiber (PCF). The photonic crystal fiber is adapted for single-mode operation in a wavelength range including the desired wavelength range, e.g., a wavelength range including wavelengths between about 365 nanometers and about 1600 nanometers. Such a single-mode optical fiber 150 has a mode field area substantially independent of wavelength. The mode field diameter of the optical fiber 150 may be made equal to or larger than a desired recording track width, e.g., about 20 micrometers.

A hybrid optical element 170 optically coupled to the exit end 160 of the optical fiber 150 focuses the combined output light within the desired wavelength range into a spot 195 on a recording medium 190 for recording. Hybrid optical element 170 has a diffractive portion 175 and a refractive portion 180 represented schematically in FIG. 1 by digital features and a curved surface respectively. Thus, hybrid optical element 170 may include a single lens having a first surface 175 formed as a diffractive surface and having a second surface 180 formed as a refractive surface.

While the combined output light from optical fiber 150 is shown in FIG. 1 as being affected first by diffractive portion 175 and secondly by refractive portion 180, hybrid optical element 170 is not limited to that specific arrangement, or even to separating the two functions (diffractive and refractive) into separate surfaces. In some embodiments, diffractive portion 175 and refractive portion 180 may be combined at a single surface of hybrid optical element 170. In other embodiments, the combined output light from optical fiber 150 may be affected first by refractive portion 180 and secondly by diffractive portion 175.

Although FIG. 1 shows the laser, optical fiber, and lens as being aligned to combine coaxially, in practice the individual lasers and/or lenses may be oriented to project their light at small angles to the optical fiber axis in order to prevent an unwanted amount of reflected light from returning to the laser after reflection from the medium, which could otherwise cause undesired side effects, such as oscillation in the source laser.

Various embodiments may include one or more sensors such as photodiodes to detect light reflected from the medium. When the optical print head is used to record digital data on an optical storage disk, for example, the sensor may be used to read the data recorded and/or to follow a track on the recording medium.

Figure 3:
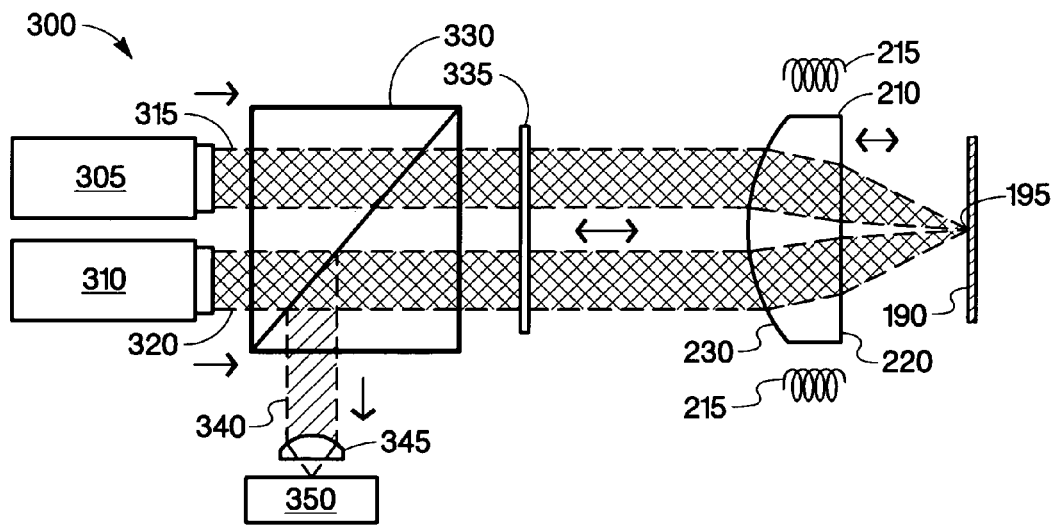
FIG. 3 is a schematic optical diagram of a third embodiment of an optical print head.

In some embodiments, such as the embodiment of FIG. 3, the combination of a beam splitter and quarter-wave plate may be used to guide the reflected beam to a sensor and prevent the reflected beam from returning to the source laser. For example, laser light propagating from left to right in FIG. 3 and incident on the quarter-wave plate 335 after passing through the beam splitter 330 is linearly polarized, and after passing through the quarter-wave plate it is circularly polarized. Reflection from medium 190 reverses the sense of the circularly polarized light. That circularly polarized light propagating from right to left in FIG. 3 is converted to linearly polarized light in its second passage through the quarter-wave plate, but with a polarization at right angles to the polarization it had previously when propagating in the original left-to-right direction. Thus, this linearly polarized light is reflected in the beam splitter and directed downward along the light path toward sensor 350. Thus, the quarter-wave plate is configured to direct the light reflected from the medium to the sensor 350.

At least some of the embodiments described herein are believed to operate in accordance with this partial description of FIG. 3. However, the invention should not be construed as being limited to the consequences of any particular theory of operation. FIG. 3 is described in more detail below.

Figure 2:
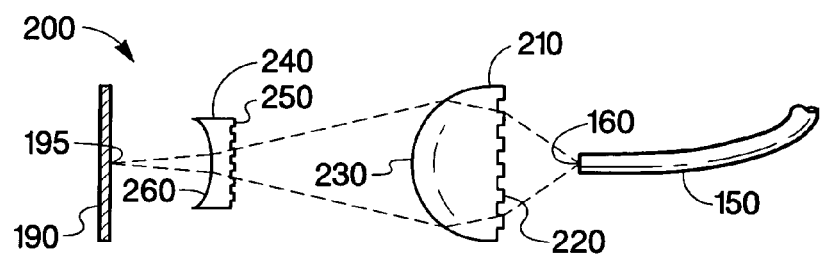
FIG. 2 is a schematic optical diagram of a portion of a second embodiment of an optical print head.

Hybrid optical element 170 is not necessarily a simple monolithic lens element. FIG. 2 shows a portion of a second embodiment of an optical print head, in which the function of hybrid optical element 170 is performed by a combination of hybrid optical elements 210 and 240 cooperating to provide a desired demagnification of the laser light from exit end 160 of the optical fiber 150, with desired effective numerical apertures (NA) to efficiently collect combined laser light from optical fiber 150 on one side and to form a focused spot 195 of suitable diameter on recording medium 190 on the other side, with suitable working distances on each side. The first discrete lens 210 of this optical arrangement may have a diffractive portion 220 and a refractive portion 230 as shown, represented schematically by digital features and a curved surface respectively as in FIG. 1. Similarly, the second discrete lens 240 of this optical arrangement may have a diffractive portion 250 and a refractive portion 260 as shown. Thus, hybrid optical element 170 may include a number of hybrid lenses, each lens having a first surface formed as a diffractive surface and having a second surface formed as a refractive surface. Hybrid optical element 170 may advantageously be made substantially achromatic for wavelengths within the desired wavelength range. Hybrid optical element 170 may also be made free of spherical aberration.

For a focused spot 195 with diameter matching a recording track width of about 23 micrometers, for example, the optical arrangement of FIG. 2 may have an entrance numerical aperture (NA) of about 0.05 to match the exit NA of optical fiber 150 and may also have an exit NA of about 0.05, for example.

FIG. 3 (partially described above) schematically shows an optical diagram of a third embodiment of an optical print head. This embodiment has two lasers 305 and 310 having laser emissions within a desired wavelength range, at least one beam splitter 330, and at least one sensor 350. Lasers 305 and 310 may be diode lasers as in FIG. 1. As described above, quarter-wave plate 335 may also be included, positioned between beam splitter 330 and the recording medium 190 as shown. The beam splitter 330 is disposed to direct a portion of light reflected from the medium for recording to the at least one sensor. A lens 345 may be provided to focus reflected light on sensor 350. The initially separate laser beams 315 and 320 from lasers 305 and 310 respectively pass through beam splitter 330 and quarter-wave plate 335 (if present) and are combined by hybrid optical element 210 into a single focused spot 195 on recording medium 190. Hybrid optical element 210 may be equipped with actuators 215, providing motion parallel to its own optical axis for focusing with an automatic-focusing-servo system. Actuators 215 may be voice coils, for example, or their functional equivalent.

The optical fiber 150 of FIGS. 1 and 2 may be included in the embodiment of FIG. 3 between beam splitter 330 and lens 210 to carry the combined laser beams 315 and 320 to lens 210 for focusing into single spot 195 on recording medium 190 and to carry reflected light 340 from recording medium 190 back to beam splitter 330 for delivery to sensor 350. As in all the embodiments described herein, the optical fiber may advantageously be a single-mode optical fiber.

Figure 4A:
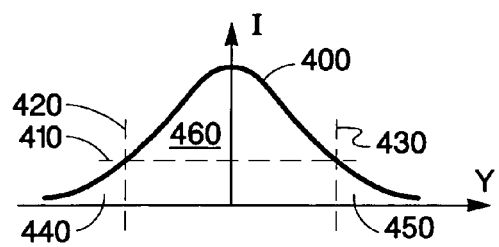
FIGS. 4A-4D are graphs depicting various irradiance distributions of laser light.

FIGS. 4A-4D are graphs depicting various irradiance distributions of laser light. Irradiance (I) is plotted in the vertical direction vs. linear distance (y) from the center of each beam, plotted in the horizontal direction. FIG. 4A shows a conventional Gaussian irradiance distribution 400 that is normally formed when the output beam of a single laser is focused on a recording medium. The horizontal dashed line 410 represents a threshold of irradiance for recording. Irradiance values less than 410 are not effective in recording on the recording medium. The vertical dashed lines 420 and 430 represent the distances from the beam center that irradiance falls below threshold 410. In FIG. 4A, only the portion 460 above line 410 and between lines 420 and 430 is effective. Thus, energy in the portions of the distribution outside the region 460, denoted by reference numerals 440 and 450, is wasted.

Figure 4B:
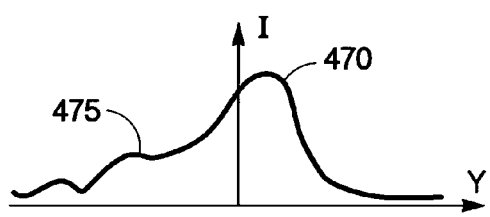
Figure 4C:
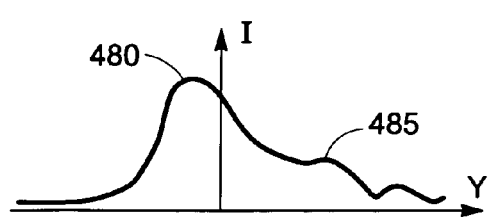
Figure 4D:
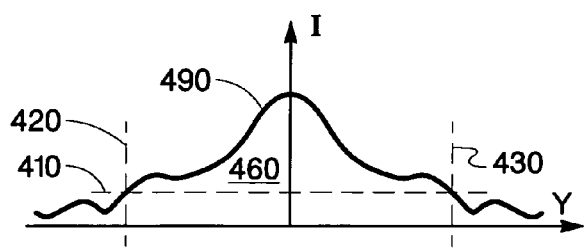

When laser beams from distinct lasers, such as lasers 110, 120, and 130 of FIG. 1 or lasers 305 and 310 of FIG. 3, are focused onto recording medium 190 from directions not coinciding with the central optical axis of hybrid optical element 170 or 210, the beams may still be made to focus at nearly the same focal spot 195 on recording medium 190, but their individual irradiance distributions at that focal spot (curves 470 and 480), as shown in FIGS. 4B and 4C, may not be symmetric Gaussian distributions, i.e., they may be distorted as shown. The combined irradiance 490 is shown in FIG. 4D (normalized to FIGS. 4A, 4B, and 4C). While the combined irradiance may have more energy outside the effective region than in FIG. 4A (outside lines 420 and 430), the energy from the combined power of two or more lasers in the central peak of this combined irradiance more than compensates for that deficiency.

The various embodiments of an optical print head disclosed herein, by including a number of lasers having laser emissions within a desired wavelength range, provide higher power at lower cost for monochromatic recording or provide for color optical recording by incorporating multiple wavelengths in the same optical print head. The optical fiber (e.g., in the form of a single-mode photonic crystal optical fiber) receiving combined light from the lasers at one end and emitting combined output light at its other end, combines the various laser emissions efficiently and allows separation of the heat-producing lasers from that portion of the print head adjacent to the recording medium. That portion may thus be made smaller and lighter than in an optical print head with lasers near the recording medium. The hybrid optical element of these embodiments, optically coupled to the exit end of the optical fiber and focusing the combined output light on the recording medium, provides efficient and low-cost coupling of laser light to the recording medium.

INDUSTRIAL APPLICABILITY

Devices made in accordance with the disclosed embodiments and their equivalents are useful in optical recording. Optical print head embodiments having laser light sources incorporating multiple lasers including various wavelengths are useful in color optical recording. Optical print head embodiments having laser light sources incorporating multiple lasers of the same wavelength are useful in optical recording at relatively high power. Optical print head embodiments employing an optical fiber may be used when separation of lasers from other components is required to avoid thermal interactions.

Although the foregoing has been a description and illustration of specific embodiments of the invention, various modifications and changes thereto can be made by persons skilled in the art without departing from the scope and spirit of the invention as defined by the following claims. For example, various equivalent materials or optical elements may be substituted for those described herein. For another example, hybrid optical element 170 may include an electrohologram for electronic control of focal length, NA, or other optical parameter.

What is claimed is:

1. An optical print head for recording on a medium, comprising:
   a) a plurality of lasers having laser emissions within a desired wavelength range,
   b) an optical fiber adapted to receive combined light from the plurality of lasers at a first end thereof and to emit combined output light at a second end thereof, and
   c) a hybrid optical element optically coupled to the second end of the optical fiber and adapted to focus the combined output light within the desired wavelength range onto the medium.

2. The optical print head of claim 1, wherein the optical fiber is a single-mode fiber.

3. The optical print head of claim 1, wherein the laser emissions of the plurality of lasers are directed substantially parallel to each other in parallel beams and the parallel beams are combined into the combined light.

4. The optical print head of claim 1, wherein the laser emissions of the plurality of lasers have differing wavelengths within the desired wavelength range.

5. The optical print head of claim 1, further comprising:
   d) at least one coupling lens, each laser being optically coupled with the at least one coupling lens.

6. The optical print head of claim 5, wherein the at least one coupling lens has an optical axis and is movable in a direction substantially parallel to its own optical axis.

7. The optical print head of claim 1, further comprising:
   d) at least one beam splitter and at least one sensor, the at least one beam splitter being disposed to direct a portion of light reflected from the medium to the at least one sensor.

8. The optical print head of claim 7, further comprising a quarter-wave plate configured to direct the light reflected from the medium to the at least one sensor.

9. The optical print head of claim 1, further comprising:
   d) a plurality of coupling lenses, each laser being optically coupled with a different one of the coupling lenses.

10. The optical print head of claim 1, wherein the optical fiber is a photonic crystal fiber.

11. The optical print head of claim 10, wherein the photonic crystal fiber is adapted for single-mode operation in a wavelength range including the desired wavelength range.

12. The optical print head of claim 1, wherein the optical fiber is adapted for single-mode operation in a wavelength range including the desired wavelength range.

13. The optical print head of claim 1, wherein the optical fiber is adapted for single-mode operation in a wavelength range including wavelengths between about 365 nanometers and about 1600 nanometers.

14. The optical print head of claim 1, wherein the optical fiber is a single-mode optical fiber having a mode field area substantially independent of wavelength.

15. The optical print head of claim 1, wherein the optical fiber is a single-mode optical fiber having a mode field diameter equal to or larger than a desired recording track width.

16. The optical print head of claim 1, wherein the optical fiber is a single-mode optical fiber having a mode field diameter equal to or larger than about 20 micrometers.

17. The optical print head of claim 1, wherein the hybrid optical element comprises a single lens having a first surface formed as a diffractive surface and having a second surface formed as a refractive surface.

18. The optical print head of claim 1, wherein the hybrid optical element comprises a plurality of hybrid lenses, each lens having a first surface formed as a diffractive surface and having a second surface formed as a refractive surface.

19. The optical print head of claim 1, wherein the hybrid optical element is substantially achromatic for wavelengths within the desired wavelength range.

20. The optical print head of claim 1, further comprising:
   d) at least one dichroic mirror adapted to combine light from the plurality of lasers into a combined beam.

21. An optical print head, for recording a label on a medium, comprising:
   a) a plurality of means for emitting coherent light having emissions within a desired wavelength range,
   b) means for guiding light, adapted to receive combined light from the plurality of means for emitting at a first end thereof and to emit combined output light at a second end thereof, wherein the means for guiding light comprises a single-mode optical fiber, and
   c) hybrid means for optically coupling, coupled to the second end of the means for guiding light and adapted to focus the combined output light within the desired wavelength range onto the medium.

22. The optical print head of claim 21, wherein the medium is an optical storage disk.

* * * * *